United States Patent [19]

Dorris

[11] 4,324,155
[45] Apr. 13, 1982

[54] MOUNTING ASSEMBLY FOR A CONTROL ACTUATOR

[75] Inventor: Robert D. Dorris, Joliet, Ill.

[73] Assignee: Caterpillar Tractor Co., Peoria, Ill.

[21] Appl. No.: 142,566

[22] Filed: Apr. 21, 1980

Related U.S. Application Data

[63] Continuation of Ser. No. 814,233, Jul. 8, 1977, abandoned.

[51] Int. Cl.³ ............................................. F16H 35/08
[52] U.S. Cl. ........................................ 74/834; 74/66; 74/99 R; 74/469; 74/522
[58] Field of Search .................. 74/55, 66, 99, 388 PS, 74/469, 471, 474, 503, 600, 606, 834, 522; 192/0.096, 0.098; 417/413

[56] References Cited

U.S. PATENT DOCUMENTS

| | | |
|---|---|---|
| 2,317,344 | 4/1943 | Hood ................................... 188/69 |
| 2,889,782 | 6/1959 | Smith ................................. 417/413 |
| 2,936,643 | 5/1960 | Smith et al. .................... 74/388 PS |
| 3,118,373 | 1/1964 | Mosemiller ......................... 74/600 |
| 4,036,066 | 7/1977 | Houk ................................... 74/55 |
| 4,067,426 | 1/1978 | Murphy ........................... 192/0.098 |

*Primary Examiner*—Kenneth Dorner
*Attorney, Agent, or Firm*—John W. Grant

[57] ABSTRACT

A mounting bracket for mounting a control actuator has a mounting surface, a mounting portion and a bore in the mounting portion. The control actuator is mounted on the mounting surface and the mounting portion is connected to a wall at an aperture in the wall. An input shaft is pivotally positioned within the bore and extends through the aperture. A device connects the input shaft to the control aperture.

7 Claims, 3 Drawing Figures

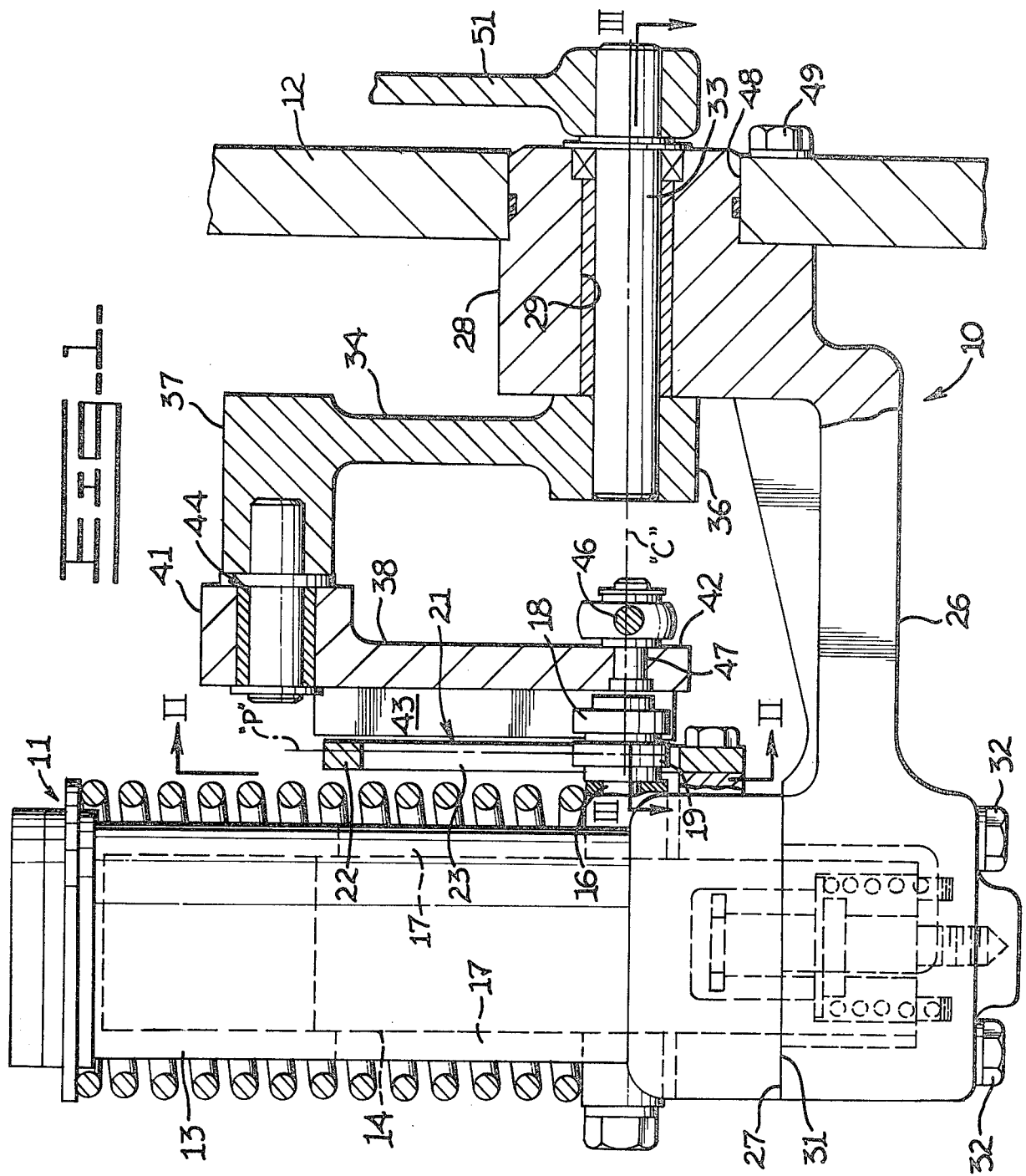

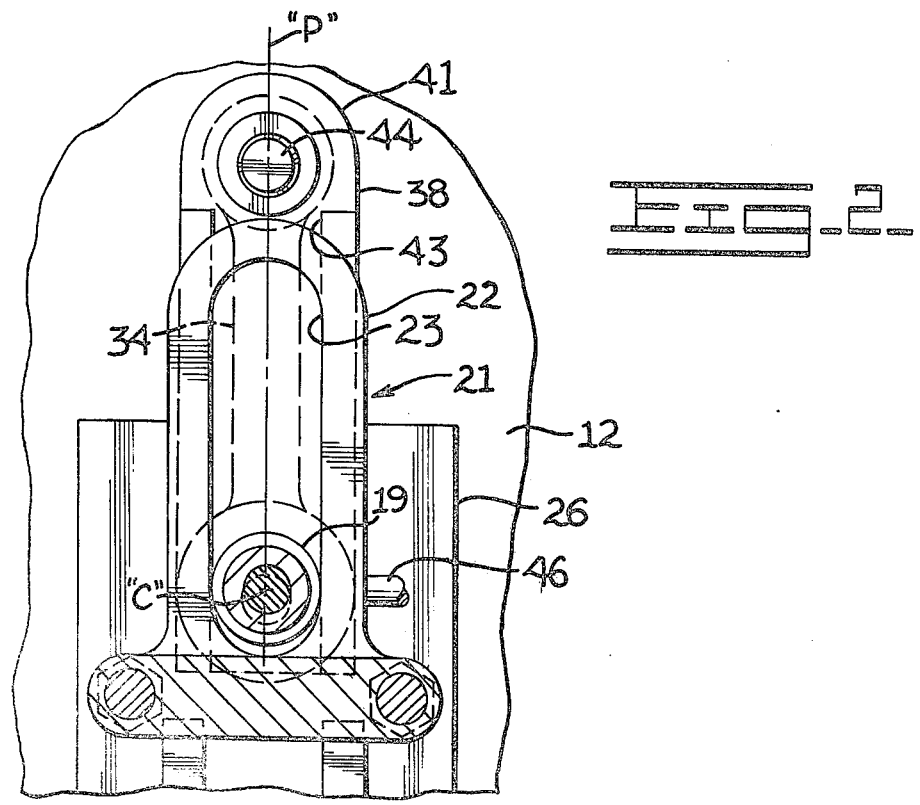
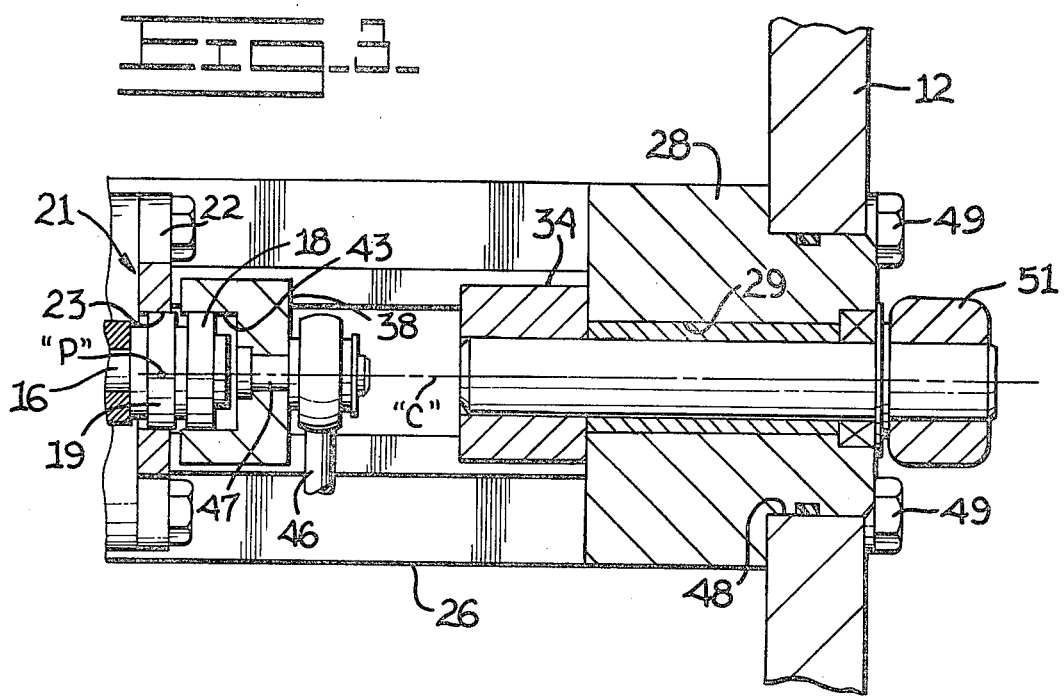

MOUNTING ASSEMBLY FOR A CONTROL ACTUATOR

This is a continuation, of Ser. No. 814,233, filed July 8, 1977 abandoned.

BACKGROUND OF THE INVENTION

Many vehicles having a hydrostatic transmission also have an underspeed actuator as a component of a control assembly which controls the speed and direction of travel of the vehicle. With some underspeed actuators, proper operation of the control assembly is dependent upon accurate positioning of an input shaft, which extends through the wall of the transmission case, relative to the linear pathway that a pivot shaft of the underspeed actuator takes during operation of the control assembly. The input shaft provides an input signal to the control assembly and when the shafts are misaligned, a false speed signal is transmitted to the pump controls, particularly at the full underspeed condition. One of the problems encountered with such control assemblies is that, heretofore, the underspeed actuator has been mounted to one wall of the transmission case separately from and independently of the mounting of the input shaft. Thus, due to manufacturing tolerances, the control assembly was occasionally assembled with the input shaft and pivot shaft in a misaligned condition. Also, vibrations in the transmission case can cause underspeed actuator to move relative to the input shaft, thereby causing a false speed signal to be transmitted to the pump.

SUMMARY OF THE INVENTION

The present invention is directed to overcoming one or more of the problems as set forth above.

According to the present invention, a mounting assembly for mounting a control actuator has a wall having an aperture extending therethrough. A mounting bracket has a mounting surface, a mounting portion and a bore in the mounting portion. The control actuator is mounted on the mounting surface and the mounting portion is connected to the wall at said aperture. An input shaft is pivotally positioned within the bore and extends through the aperture. A means connects the input shaft to the control actuator.

BRIEF DESCRIPTION OF THE DRAWINGS

FIG. 1 is a diagrammatic cross sectional view of the mounting assembly of the present invention.

FIG. 2 is a sectional view taken along line II—II of FIG. 1.

FIG. 3 is a sectional view taken along line III—III of FIG. 1.

DETAILED DESCRIPTION

Referring now to FIG. 1, a mounting assembly is generally indicated at 10 and mounts a control or underspeed actuator 11 within a transmission case, one wall of which is partially shown at 12. The underspeed actuator has a body 13 and a piston 14 slidably positioned within the body. The piston is movable along its longitudinal axis between first and second positions in response to hydraulic signals delivered to the underspeed actuator in the usual manner. The piston 14 is shown in the first position which is commonly referred to as a full underspeed position. A roller shaft 16 is connected to the piston and extends outwardly substantially perpendicular to the longitudinal axis of the piston through slots 17 in the body. First and second rollers 18, 19 are rotatably and concentrically positioned on the roller shaft.

Referring also to FIGS. 2 and 3, a means 21 guides the roller shaft 16 along a linear pathway "P" substantially parallel to said longitudinal axis in response to movement of the piston between said first and second positions. The means 21 preferably can be the second roller 19 and a guide member 22 secured to the body and having a guide slot 23 therein. The second roller is rollably positioned within the guide slot 23.

A mounting bracket 26 has a mounting surface 27, an annular mounting portion 28, and a bore 29 in the annular portion. The body 13 of the underspeed actuator 11 has a mounting surface 31 seated on the mounting surface 27 and is connected to the mounting bracket 26 by a plurality of bolts 32. Preferably, the bore 29 is positioned at a location sufficient for having its axis or centerline "C" intersecting the linear pathway "P" substantially perpendicular to the linear pathway.

An elongate input pivot shaft 33 is pivotally positioned within the bore 29 of the mounting bracket 26 and has a common longitudinal axis with the roller shaft 16 at the first position of the piston 14 of the underspeed actuator 11.

A first lever 34 has first and second end portions 36, 37. The first end portion is rigidly connected to an inner end of the input shaft 33.

A second lever 38 has first and second end portions 41, 42 and a guide track 43 on one side adjacent the guide member 22. The second lever 38 is pivotally connected at its first end portion 41 to the second end portion 37 of the first lever 34 at a pivot 44. The guide track 43 is positioned adjacent the guide member 22 and rollably receives the first roller 18. A control rod, partially shown at 46, is pivotally connected to the second end portion 42 of the second lever by a pin 47. The other end of the control rod is suitably connected to the speed and directional controls of the transmission, not shown. At the first position of the piston 14, the centerline of the pin 47 is slightly below the centerline "C" of the bore 29.

The annular portion 28 of the mounting bracket 26 extends through a bore 48 in the wall 12 of the transmission case and is connected to the wall by bolts 49. An operator actuated lever 51 is rigidly connected to an outer end of the input shaft 33.

In use, the input shaft 33 is inserted into the bore 29 to position the first lever 34 adjacent the inner side of the annular portion 28, the first end portion 41 of the second lever 38 is pivotally connected to the second end portion 37 of the first lever, and the body 13 of the underspeed actuator 11 is connected to the mounting bracket 26 thereby providing a modular assembly which can be mounted within the transmission case as a unit. Since the underspeed actuator 11 and the input shaft 33 are both connected to the mounting bracket 26, the position of the bore 29 and hence the input shaft 33 relative to the roller shaft 16 can be accurately controlled to minimize misalignment between the roller shaft and the input shaft.

In operation, rotation of the input pivot shaft 33 by movement of the lever 51 causes pivot 44 connected to the second end 37 of the first lever 34 to swing in an arcuate pathway. At the first position of the piston 14, the roller shaft 16 and first and second rollers 18, 19 are on a common longitudinal axis with the input shaft 33 such that rotation of the second lever causes only limited linear movement of the control rod 46. The amount of movement is determined by the offset of the pin 47 relative to the centerline "C" and is preselected to correspond to the amount of deadband in the pump control mechanism to which the control rod is connected.

At the second position of the piston 14 or any position intermediate the first and second positions, movement of the first lever 34 causes the second lever 38 to pivot about the first roller 18 thereby moving the control rod 46 for changing the speed of the transmission.

Other aspects, objects and advantages of this invention can be obtained from a study of the drawings, the disclosure and the appended claims.

The embodiments of the invention in which an exclusive property or privilege is claimed are defined as follows:

1. A mounting assembly for mounting a control actuator and its associated control linkage to a wall having an aperture extending therethrough, said control actuator having a control actuator shaft moveable between first and second positions along a linear pathway perpendicular to the axis of the control actuator shaft, said control linkage having an input shaft linked to the control actuator shaft, said mounting assembly comprising:

a mounting bracket having a mounting surface on which the control actuator is mounted, a wall mounting portion for mounting the mounting bracket at the aperture in the wall, and a bore in the wall mounting portion, said input shaft being rotatably positioned within the bore and extending through the aperture, said bore and hence said input shaft having an axis intersecting the linear pathway of the control actuator shaft.

2. The mounting assembly of claim 1 wherein the input shaft and the control actuator shaft have a common longitudinal axis at the first position of the control actuator shaft.

3. The mounting assembly of claim 2 wherein the axis of the bore is substantially perpendicular to the linear pathway of the control actuator shaft.

4. The mounting assembly of claim 1 including a roller rotatably positioned on the control actuator shaft and wherein said control linkage includes a first lever having first and second end portions, said first end portion being rigidly connected to the end of the input shaft, and a second lever having first and second end portions and a guide track, said first end portion of said second lever being pivotally connected to the second end portion of the first lever, said second lever and said guide track being positioned at a location sufficient for rollably receiving said roller in said guide track.

5. A control actuator assembly comprising a control actuator having a control actuator shaft movable along a linear pathway perpendicular to the axis of the shaft; a mounting bracket having a mounting surface on which the control actuator is mounted, and a wall mounting portion for mounting the mounting bracket at an aperture in a wall to which the assembly is to be attached, the wall mounting portion having a bore extending therethrough, the bore having an axis intersecting the linear pathway of the control actuator shaft; and an input shaft pivotally positioned within the bore to extend, in use, through the aperture in the wall, the input shaft being linked to the control actuator shaft.

6. The control actuator assembly of claim 5 wherein the axis of the bore is substantially perpendicular to the linear pathway of the control actuator shaft.

7. A mounting assembly for mounting a control actuator comprising:

a wall having an aperture extending therethrough;

a mounting bracket having a mounting surface on which the control actuator is mounted, a wall mounting portion for mounting the mounting bracket at the aperture in the wall, and a bore extending through the wall mounting portion;

said control actuator having a control actuator shaft movable along a linear pathway between first and second positions;

said bore having an axis and being positioned at a location sufficient for having the axis intersecting said linear pathway of the control actuator shaft;

an input shaft pivotally positioned within the bore and extending through the aperture;

a roller rotatably positioned on the control actuator shaft; and means for connecting the input shaft to the control actuator shaft including a first lever having first and second end portions, the first end portion being rigidly connected to one end of the input shaft, and a second lever having first and second end portions and a guide track, the first end portion of the second lever being pivotally connected to the second end portion of the first lever, the second lever and said guide track being positioned at a location sufficient for rollably receiving the roller in said guide track.

* * * * *